(12) United States Patent
Cheng

(10) Patent No.: US 10,341,961 B2
(45) Date of Patent: Jul. 2, 2019

(54) POWER CONTROL FRAMEWORK FOR MULTI-BEAM CONFIGURATION

(71) Applicant: CHINA ACADEMY OF TELECOMMUNICATIONS TECHNOLOGY, Beijing (CN)

(72) Inventor: Fang-Chen Cheng, Randolph, NJ (US)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/933,781

(22) Filed: Mar. 23, 2018

(65) Prior Publication Data

US 2018/0324708 A1 Nov. 8, 2018

Related U.S. Application Data

(60) Provisional application No. 62/502,424, filed on May 5, 2017.

(51) Int. Cl.
*H04W 52/24* (2009.01)
*H04W 72/04* (2009.01)
(Continued)

(52) U.S. Cl.
CPC ........... *H04W 52/24* (2013.01); *H04L 5/0048* (2013.01); *H04W 52/146* (2013.01);
(Continued)

(58) Field of Classification Search
CPC ............. H04W 52/146; H04W 52/242; H04W 52/283; H04W 52/225; H04W 52/244;
(Continued)

(56) References Cited

U.S. PATENT DOCUMENTS 9,918,281 B2 3/2018 Xu et al.
2006/0234646 A1* 10/2006 Naguib ................. H04L 1/0003
455/69
(Continued)

FOREIGN PATENT DOCUMENTS

CN 101404527 A 4/2009
CN 104254121 A 12/2014

OTHER PUBLICATIONS

PCT International Search Report and the Written Opinion dated Jun. 13, 2018, issued in related International Application No. PCT/CN2018/080159 (7 pages).
(Continued)

*Primary Examiner* — Tan H Trinh
(74) *Attorney, Agent, or Firm* — Sheppard Mullin Richter & Hampton LLP

(57) ABSTRACT

A method for determining a Physical Uplink Share Channel (PUSCH) transmission power may comprise measuring reference signal received power, calculating downlink path loss by comparing the reference signal received power to a downlink transmit power from a next generation node B (gNB), obtaining parameters from the gNB, and determining the PUSCH transmission power based on a configured user equipment (UE) transmission power, bandwidth of PUSCH resource assignment, a target power including the sum of a cell specific nominal component and a UE specific component, a scaling factor, a downlink (DL) path loss, a UE specific parameter for different types of traffic, and a PUSCH power control adjustment state. The method may further comprise calculating a numerology adjustment factor based on a configured subcarrier spacing and a default subcarrier spacing, and utilizing the numerology adjustment factor to determine the PUSCH transmission power.

18 Claims, 10 Drawing Sheets

(51) Int. Cl.
*H04L 5/00* (2006.01)
*H04W 88/10* (2009.01)
*H04W 52/14* (2009.01)
*H04W 52/26* (2009.01)
*H04W 52/36* (2009.01)

(52) U.S. Cl.
CPC ....... *H04W 52/242* (2013.01); *H04W 52/245* (2013.01); *H04W 52/265* (2013.01); *H04W 52/367* (2013.01); *H04W 72/0406* (2013.01); *H04W 88/10* (2013.01)

(58) Field of Classification Search
CPC .. H04W 24/10; H04W 52/245; H04W 64/003
USPC .................. 455/69, 522, 62, 73, 422.1, 561; 370/329, 336, 241, 328
See application file for complete search history.

(56) References Cited

U.S. PATENT DOCUMENTS

| | | | |
|---|---|---|---|
| 2011/0310811 A1* | 12/2011 | Yamada | H04W 52/146 370/329 |
| 2012/0028630 A1* | 2/2012 | Yamamoto | H04W 52/242 455/422.1 |
| 2012/0129566 A1* | 5/2012 | Lee | H04W 52/146 455/522 |
| 2013/0188580 A1* | 7/2013 | Dinan | H04W 52/281 370/329 |
| 2013/0196606 A1* | 8/2013 | Brown | H04W 52/242 455/73 |
| 2013/0272229 A1* | 10/2013 | Dinan | H04W 52/18 370/329 |
| 2013/0272231 A1* | 10/2013 | Dinan | H04W 52/34 370/329 |
| 2013/0272233 A1* | 10/2013 | Dinan | H04W 72/0406 370/329 |
| 2016/0044611 A1* | 2/2016 | Dai | H04W 52/146 370/329 |
| 2016/0219527 A1* | 7/2016 | Zhao | H04W 52/12 |
| 2017/0078975 A1* | 3/2017 | Takeda | H04W 52/30 |
| 2017/0318544 A1* | 11/2017 | Kwon | H04W 52/146 |
| 2017/0325174 A1* | 11/2017 | Dinan | H04W 52/146 |
| 2017/0325175 A1* | 11/2017 | Dinan | H04W 52/146 |
| 2018/0124831 A1* | 5/2018 | Dinan | H04L 41/0813 |
| 2018/0184443 A1* | 6/2018 | Li | H04W 72/1247 |
| 2018/0255532 A1* | 9/2018 | Li | H04W 72/042 |
| 2018/0278467 A1* | 9/2018 | John Wilson | H04L 41/0654 |
| 2018/0279376 A1* | 9/2018 | Dinan | H04W 74/0833 |
| 2018/0310257 A1* | 10/2018 | Papasakellariou | H04W 52/30 |

OTHER PUBLICATIONS

3GPP TS 36.213 V8.4.0 (Sep. 2008), 3$^{rd}$ Generation Partnership Project; Technical Specification Group Radio Access Network; Evolved Universal Terrestrial Radio Access (E-UTRA); Physical layer procedures (Release 8), 60 pages.

* cited by examiner

POWER CONTROL FRAMEWORK FOR MULTI-BEAM CONFIGURATION

CROSS REFERENCE TO RELATED APPLICATION

This application claims the benefit of priority to U.S. Provisional Application No. 62/502,424, filed with the United States Patent and Trademark Office on May 5, 2017, and entitled "POWER CONTROL FRAMEWORK FOR MULTI-BEAM CONFIGURATION," which is hereby incorporated by reference in its entirety.

TECHNICAL FIELD

The disclosure relates generally to transmission power control, in particular, to Physical Uplink Share Channel (PUSCH) power control in a multi-beam configuration.

BACKGROUND

Uplink (UL) power control aims at setting transmission power to meet desired Quality of Service (QoS) at a reception point as well as to minimize interference to neighboring reception points. In a multi-beam configuration, there may be multiple reception points. So the UL transmission power should be adapted to the target reception points for link adaptation gain. The general principle for transmission power control in Long Term Evolution (LTE) mobile communication networks takes into account factors including target Signal to Interference and Noise Ratios (SINRs) for specific services, UL transmit bandwidth, downlink (DL) path loss to a serving cell, fractional power control with higher layer configured parameters, adjustment for different transport format (e.g., Uplink Control Information (UCI)), and close-loop power correction.

The 5G new radio (NR) communication networks may define beam specific open and closed loop parameters for beam specific power control. A next generation node B (gNB) in 5G new radio networks may also obtain different power headroom for the different waveforms if a user equipment (UE) can be configured for different waveforms. Accordingly, the principle of beam specific power control in 5G new radio (NR) communication networks should include additional variables in multi-beam configuration.

SUMMARY

One aspect of the present disclosure is directed to a method for determining a Physical Uplink Share Channel (PUSCH) transmission power. The method may be implementable by a user equipment (UE). The method may comprise: measuring reference signal received power; calculating downlink path loss by comparing the reference signal received power to a downlink transmit power from a next generation node B (gNB); obtaining parameters from the gNB; and determining the PUSCH transmission power $P_{PUSCH,c}(i,j)$ for a PUSCH transmission of a serving cell c using parameter set configuration with index j in PUSCH transmission period i, based on a formula as follows:

$$P_{PUSCH,c}(i, j) = \min\left\{\begin{array}{l} P_{CMAX,c}(i), \\ 10\log_{10}(M_{PUSCH,c}(i)) + P_{O\_PUSCH,c}(j) + \\ \alpha_c(j)\cdot PL_c + \Delta_{TF,c}(i) + f_c(i) \end{array}\right\},$$

where $P_{CMAX,c}(i)$ is a configured UE transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is a target power including the sum of a cell specific nominal component $P_{O\_NOMINAL\_PUSCH,c}(j)$ and a UE specific component $P_{O\_UE\_PUSCH,c}(j)$, $\alpha_c(j)$ is a scaling factor, $PL_c$ is a downlink (DL) path loss, $\Delta_{TF,c}(i)$ is a UE specific parameter for different types of traffic, and $f_c(i)$ is PUSCH power control adjustment state for the PUSCH transmission period i.

In some embodiments, the method may further comprise calculating a numerology adjustment factor $\delta_{SCS}$ as follows:

$$\delta_{SCS} = 10\log\left(\frac{SCS_{conf}}{SCS_{default}}\right) \text{ [dB]},$$

wherein $SCS_{conf}$ is a configured subcarrier spacing for the PUSCH transmission and $SCS_{default}$ is default subcarrier spacing; and utilizing the numerology adjustment factor $\delta_{SCS}$ as an additional parameter to determine the PUSCH transmission power as follows:

$$P_{PUSCH,c}(i, j) = \min\left\{\begin{array}{l} P_{CMAX,c}(i), \\ 10\log_{10}(M_{PUSCH,c}(i)) + \delta_{SCS} + P_{O\_PUSCH,c}(j) + \\ \alpha_c(j)\cdot PL_c + \Delta_{TF,c}(i) + f_c(i) \end{array}\right\}.$$

In some embodiments, the method may further comprise: determining a reliability requirement of the PUSCH transmission; and setting a value of a UE specific component $P_{O\_UE\_PUSCH,c}(j)$ in the target power $P_{O\_PUSCH,c}(j)$ based on the reliability requirement. In some embodiments, the reliability requirement may include one or more of Ultra Reliable Low Latency Communication (URLLC) and enhanced Mobile Broadband (eMBB).

In some embodiments, the method may further comprise: determining a UL multiple access scheme of the PUSCH transmission; and setting a value of the nominal component $P_{O\_NOMINAL\_PUSCH,c}(j)$ of the target power $P_{O\_PUSCH,c}(j)$ based on the UL multiple access scheme. In some embodiments, the multiple access scheme may include one or more of scheduled based orthogonal multiple access (SB-OMA), non-orthogonal multiple access (NOMA) and grant free multiple access (GRMA).

In some embodiments, the method may further comprise: measuring peak-to-average power ratio (PAPR); calculating a back-off factor $\Delta_{B,c}(j)$ based on the measured PAPR, $PAPR_{measured}$, and the average PAPR of Discrete Fourier Transform-spread-Orthogonal Frequency Division Multiplexing (DFT-S-OFDM), Avg. $PAPR_{DFT-S-OFDM}$, as follows:

$$\Delta_{B,c}(j) = 10\log\left(\frac{PAPR_{measured}}{Avg.PAPR_{DFT-S-OFDM}}\right) \text{ [dB]};$$

and utilizing the back-off factor $\Delta_B(j)$ as an additional parameter to determine the transmission power as follows:

$$P_{PUSCH,c}(i, j) = \min\left\{\begin{array}{l}P_{CMAX,c}(i) - \Delta_{B,c}(j),\\ 10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\}.$$

In some embodiments, the method may further comprise: obtaining individual downlink (DL) path loss $PL_{c,m}$ of one beam m among multiple detected beams in multi-beam configuration, wherein m∈{1, 2, . . . , M} and M is the number of the multiple detected beams; and calculating the DL path loss $PL_c$ as follows: $PL_c = PL_{c,R} + \delta_{c,R,m}$, wherein $PL_{c,R}$ is a reference path loss, $\delta_{c,R,m} = \beta*(PL_{c,m} - PL_{c,R})$, wherein β is a correlation factor between beams configured by higher layer and 0<β≤1.

In some embodiments, the method may further comprise: obtaining individual downlink (DL) path loss $PL_{c,m}$ of one beam m among multiple detected beams in multi-beam configuration, wherein m∈{1, 2, . . . , M} and M is the number of the multiple detected beams; and calculating the downlink (DL) path loss $PL_c$ based on an optimization of joint reception of multiple path losses. In some embodiments, the downlink path loss $PL_c$ may be calculated as the minimum of all individual DL path losses, min{$PL_{c,1}$, $PL_{c,2}$, . . . , $PL_{c,M}$}. In some embodiments, the DL path loss $PL_c$ may be calculated as the maximum of all individual DL path losses, {$PL_{c,1}$, $PL_{c,2}$, . . . , $PL_{c,M}$}. In some embodiments, the DL path loss $PL_c$ may be calculated as a weighted combination of all individual DL path losses, $$\frac{1}{M}(w_1 PL_{c,1} + w_2 PL_{c,2} + \ldots + w_M PL_{c,M}).$$

Another aspect of the present disclosure is directed to a user equipment (UE) for determining a PUSCH transmission power. The user equipment may comprise: one or more processors; and a memory storing instructions that, when executed by the one or more processors, cause the user equipment to perform: measuring reference signal received power; calculating downlink path loss by comparing the reference signal received power to a downlink transmit power from a next generation node B (gNB); obtaining parameters from the gNB; and determining the PUSCH transmission power $P_{PUSCH,c}(i,j)$ for a PUSCH transmission of a serving cell c using parameter set configuration with index j in PUSCH transmission period i, based on a formula as follows:

$$P_{PUSCH,c}(i, j) = \min\left\{\begin{array}{l}P_{CMAX,c}(i),\\ 10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\},$$

wherein $P_{CMAX,c}(i)$ is a configured UE transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is a target power including the sum of a cell specific nominal component $P_{O\_NOMINAL\_PUSCH,c}(j)$ and a UE specific component $P_{O\_UE\_PUSCH,c}(j)$, $\alpha_c(j)$ is a scaling factor, $PL_c$ is a downlink (DL) path loss, $\Delta_{TF,c}(i)$ is a UE specific parameter for different types of traffic, and $f_c(i)$ is PUSCH power control adjustment state for the PUSCH transmission period i.

Yet another aspect of the present disclosure is directed to a base station of a communication system for facilitating the determination of a PUSCH transmission power. The base station may comprise a transceiver and a controller controlling the transceiver, wherein the controller may comprise one or more processors and a memory storing instructions. The instructions, when executed by the one or more processors, may cause the system to perform: transmitting a signal including a reference signal to a user equipment (UE); signaling parameters to the user equipment for determining a PUSCH transmission power $P_{PUSCH,c}(i,j)$ for a PUSCH transmission of a serving cell c using parameter set configuration with index j in PUSCH transmission period i, based on a formula as follows:

$$P_{PUSCH,c}(i, j) = \min\left\{\begin{array}{l}P_{CMAX,c}(i),\\ 10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\},$$

where $P_{CMAX,c}(i)$ is a configured user equipment (UE) transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is a target power including the sum of a cell specific nominal component $P_{O\_NOMINAL\_PUSCH,c}(j)$ and a UE specific component $P_{O\_UE\_PUSCH,c}(j)$, $\alpha_c(j)$ is a scaling factor, $PL_c$ is a downlink path loss, $\Delta_{TF,c}(i)$ is a UE specific parameter for different types of traffic, and f(i) is PUSCH power control adjustment state for the PUSCH transmission period i.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Figure 1:
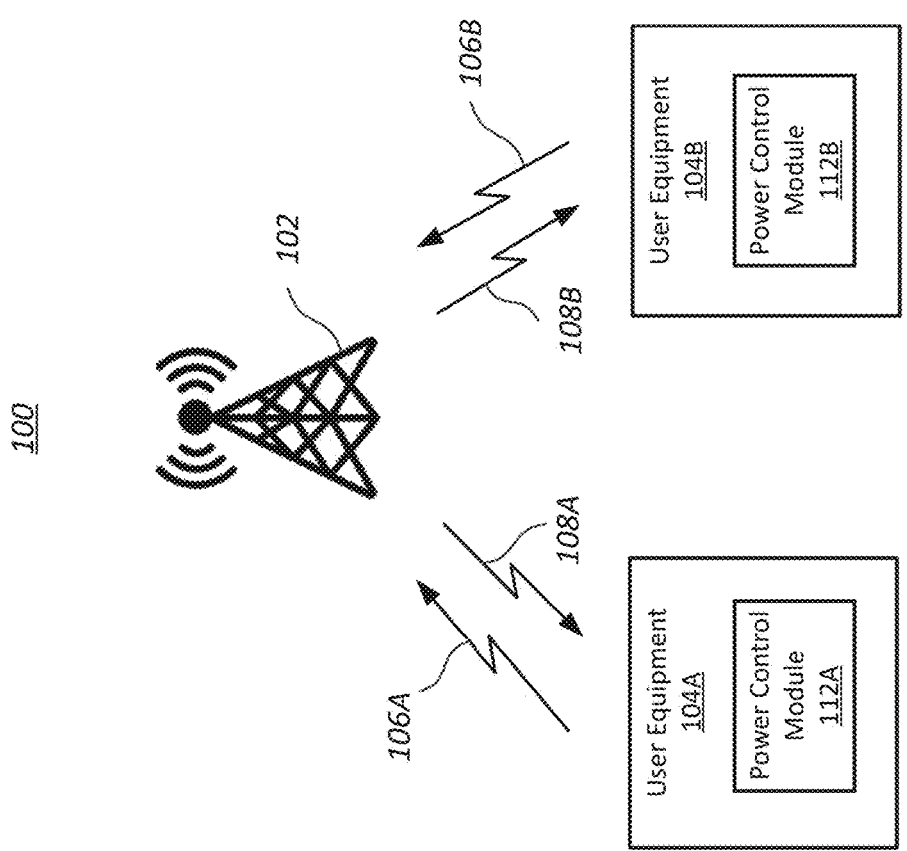
FIG. 1 illustrates an example communication system for uplink (UL) power control in multi-beam configuration in accordance with various embodiments of the disclosure.

FIG. 1 illustrates an example communication system 100 for uplink (UL) power control in multi-beam configuration in accordance with various embodiments. The example communication system 100 may include a base station 102, and user equipment 104A, 104B (also collectively and individually referred to as 104). While only one base station 102 and two user equipment 104A, 104B are shown in FIG. 1, this is merely for ease of reference and is not meant to be limiting. The communication system 100 may have multiple base station 102, and/or more than two user equipment 104. As shown in FIG. 1, uplink (UL) communication 116A, 116B, and downlink (DL) communication 118A, 118B (also collectively and individually referred to as 116, 118 respectively) occur between the base station 102 and the user equipment 104A, 104B.

In some embodiments, the base station 102 is a 5G next generation base station, referred to as a next generation node B (gNB), supporting 5G new radio networks. In other embodiments, the base station may be an E-UTRAN Node B (eNB) supporting Long Term Evolution (LTE) mobile communication networks, a Node B in 3G Universal Mobile Telecommunications System (UMTS) mobile communication networks, or a base transceiver station (BTS) in 2G Global System for Mobile Communications (GSM) networks. Accordingly, the user equipment 104 may be user devices such as mobile phones, smart phones, laptop computers or tablets equipped with a mobile broadband adapter, or any other devices supporting communication through one of the above-described networks. For example, the user equipment 104 may be a mobile phone supporting communication via 5G new radio networks.

In some embodiments, the base station 102 may include a transceiver and a controller that controls the transceiver to transmit and receive communication signals to and from the user equipment 104 via the UL and DL communication 116, 118. In some embodiments, the base station 102 and user equipment 104 may include one or more processors and memory (e.g., permanent memory, temporary memory). The processor(s) may be configured to perform various operations by interpreting machine-readable instructions stored in the memory. The base station 102 and user equipment 104 may include other computing resources and/or have access (e.g., via one or more connections/networks) to other computing resources.

In some embodiments, the base station 102 may be configured to facilitate the user equipment 104 to determinate a Physical Uplink Share Channel (PUSCH) transmission power. The base station 102 may transmit a signal including a reference signal to the user equipment 104, which the user equipment 104 may use to measure reference signal received power and calculate a downlink (DL) path loss based on the reference signal received power. Further, the base station 102 may signal parameters to the user equipment 104 for determining a PUSCH power. For example, the base station 102 may broadcast parameters to the user equipment 104 for determining the PUSCH power according to the formulas described in detail below.

As shown in FIG. 1, the user equipment 104A, 104B may include a power control module 112A, 112B (also collectively and individually referred to as 112) that may be configured to perform the uplink (UL) power control in a multi-beam configuration. For example, the power control module 112 may set the UL transmission power in compensation of fractional path loss of specific link to achieve the target Signal to Interference and Noise Ratio (SINR) and minimize the interference to the neighboring receiving points. The power control module 112 may determine the UL transmission power based on multiple factors or parameters, e.g., UL transmit bandwidth, target SINR for specific services, downlink (DL) path loss to the serving cell, fractional power control with higher layer configured parameters, adjustment for different transport format (e.g., UCI), and close-loop power correction, etc.

In some embodiments, the power control module 112 may measure reference signal received power and calculate downlink (DL) path loss based on the reference signal received power. In addition, the power control module 112 may obtain the parameters from the base station 102. The power control module 112 may determine a PUSCH transmission power $P_{PUSCH,c}(i,j)$ for a PUSCH transmission of a serving cell c using parameter set configuration with index j in PUSCH transmission period i, based on a formula as follows:

$$P_{PUSCH,c}(i, j) = \min \left\{ \begin{array}{c} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{array} \right\} \quad (1)$$

where $P_{CMAX,c}(i)$ is the configured user equipment (UE) transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is the target power including the sum of a cell specific nominal component $P_{O\_NOMINAL\_PUSCH,c}(j)$ and a UE specific component $P_{O\_UE\_PUSCH,c}(j)$, $\alpha_c(j)$ is a scaling factor, $PL_c$ is the downlink path loss, $\Delta_{TF,c}(i)$ is a UE specific parameter for different types of traffic, and f(i) is PUSCH power control adjustment state for the PUSCH transmission period i.

In some embodiments, the power control module 112 may be configured to calculate a numerology adjustment factor as another parameter for determining the PUSCH transmission power. In other embodiments, the base station 102 may determine the numerology adjustment factor and signal (e.g., broadcast) it to the user equipment 104. The communication system 100 supports different numerologies and operation of mixed numerologies in frequency or time division multiplexing (FDM or TDM). One Physical Resource Block (PRB) contains 12 Resource Elements (REs) in frequency regardless what numerology the system 100 uses. When UL transmission is configured with a subcarrier spacing different from the default subcarrier spacing, the bandwidth of PUSCH resource increases or decreases in proportion to the increase or decrease of the subcarrier spacing. Therefore, an adjustment factor reflecting different numerologies may be used to adjust the PUSCH transmission power. For example, the numerology adjustment factor may be calculated to be a non-zero value when the subcarrier spacing is different from the default subcarrier spacing. Specifically, the numerology adjustment factor for different numerologies may be defined as follows, $$\delta_{SCS} = 10 \log\left(\frac{SCS_{conf}}{SCS_{default}}\right) [dB], \quad (2)$$

where $\delta_{SCS}$ represents the numerology adjustment factor, $SCS_{conf}$ is configured subcarrier spacing for the PUSCH transmission and $SCS_{default}$ is default subcarrier spacing used for Physical Random Access Channel (PRACH) in an initial access.

The power control module 112 may utilize the numerology adjustment factor $\delta_{SCS}$ as an additional parameter to determine the PUSCH transmission power as follows:

$$P_{PUSCH,c}(i, j) = \min\left\{\begin{array}{l} P_{CMAX,c}(i), \\ 10\log_{10}(M_{PUSCH,c}(i)) + \delta_{SCS} + P_{O\_PUSCH,c}(j) + \\ \alpha_c(j) \cdot PL_c + \Delta_{TF,c}(i) + f_c(i) \end{array}\right\}. \quad (3)$$

In some embodiments, the power control module 112 may be configured to determine a reliability requirement of the PUSCH transmission and set a corresponding component of the transmission power based on the reliability requirement. In other embodiments, the base station 102 may determine a reliability requirement of the PUSCH transmission and signal (e.g., broadcast) the information describing the reliability requirement to the user equipment 104 for determining the PUSCH transmission power. The communication system 100 may supports service with different reliability requirements, e.g., Ultra Reliable Low Latency Communication (URLLC), enhanced Mobile Broadband (eMBB), etc. Accordingly, the target SINR may be set differently for services with different reliability requirements. One element of the transmission power—the target power $P_{O\_PUSCH,c}(j)$ may be set based on the target SINR and include a cell specific nominal component $P_{O\_NOMINAL\_PUSCH,c}(j)$ and a UE-specific component $P_{O\_UE\_PUSCH,c}(j)$. The cell nominal component $P_{O\_NOMINAL\_PUSCH,c}(j)$ is specified for power setting of cell-specific operation, e.g., Random Access Channel (RACH) Msg3 power. The UE-specific component $P_{O\_UE\_PUSCH,c}(j)$ is used to reflect different target SINR based on the UE-specific operation, e.g., Semi-Persistent Scheduled (SPS) retransmission. Therefore, the UE-specific component $P_{O\_UE\_PUSCH,c}(j)$ may be set to different values to support services with different reliability requirements, e.g., URLLC, eMBB.

In some embodiments, the power control module 112 may be configured to determine a UL multiple access scheme of the PUSCH transmission and set a corresponding component of the PUSCH transmission power based on the determined UL multiple access scheme. In other embodiments, the base station 102 may determine the UL multiple access scheme of the PUSCH transmission and signal (e.g., broadcast) the determined UL multiple access scheme to the user equipment 104. The communication system 100 may support different UL multiple access schemes, e.g., scheduled based orthogonal multiple access (SB-OMA), non-orthogonal multiple access (NOMA), grant free multiple access (GRMA), etc. Interference levels of different multiple access schemes may be different. Accordingly, the setting of the target power $P_{O\_PUSCH,c}(j)$ may be adapted to the interference level of each multiple access scheme to meet the target SINR. Because the multiple access scheme is a cell specific operation, the cell specific nominal component $P_{O\_NOMINAL\_PUSCH,c}(j)$ of the target power $P_{O\_PUSCH,c}(j)$ may be set to different values to adapt for different interference levels of different multiple access scheme.

In some embodiments, the power control module 112 may be configured to measure a peak-to-average power ratio (PAPR) and calculate a back-off factor based on the measured PAPR. The back-off factor may be further used to determine the PUSCH transmission power. In other embodiments, the base station 102 may determine the PAPR and signal (e.g., broadcast) it to the user equipment 104. The communication system 100 may support both a cyclic prefix-Orthogonal Frequency Division Multiplexing (CP-OFDM) and Discrete Fourier Transform-spread-Orthogonal Frequency Division Multiplexing (DFT-S-OFDM) based waveforms. It supports both at least for eMBB uplink for up to 40 GHz. The CP-OFDM and DFT-S-OFDM based waveforms may have different PAPR values. The maximum power for CP-OFDM waveform with high PAPR may be back off with a factor to operate UE linear amplifier (LNA) for both waveforms without signal distortion. For example, the back-off factor $\Delta_{B,c}(j)$ may be determined based on the difference of the measured PAPR, $PAPR_{measured}$, and the average PAPR of DFT-S-OFDM, Avg. $PAPR_{DFT-S-OFDM}$. Specifically, the back-off factor $\Delta_{B,c}(j)$ may be calculated as follows:

$$\Delta_{B,c}(j) = 10\log\left(\frac{PAPR_{measured}}{Avg.PAPR_{DFT-S-OFDM}}\right) [dB]. \quad (4)$$

The back-off factor $\Delta_{B,c}(j)$ may be used as an additional parameter to determine the PUSCH transmission power as follows:

$$P_{PUSCH,c}(i, j) = \min\left\{\begin{array}{l} P_{CMAX,c}(i) - \Delta_{B,c}(j), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{array}\right\}. \quad (5)$$

Figure 2:
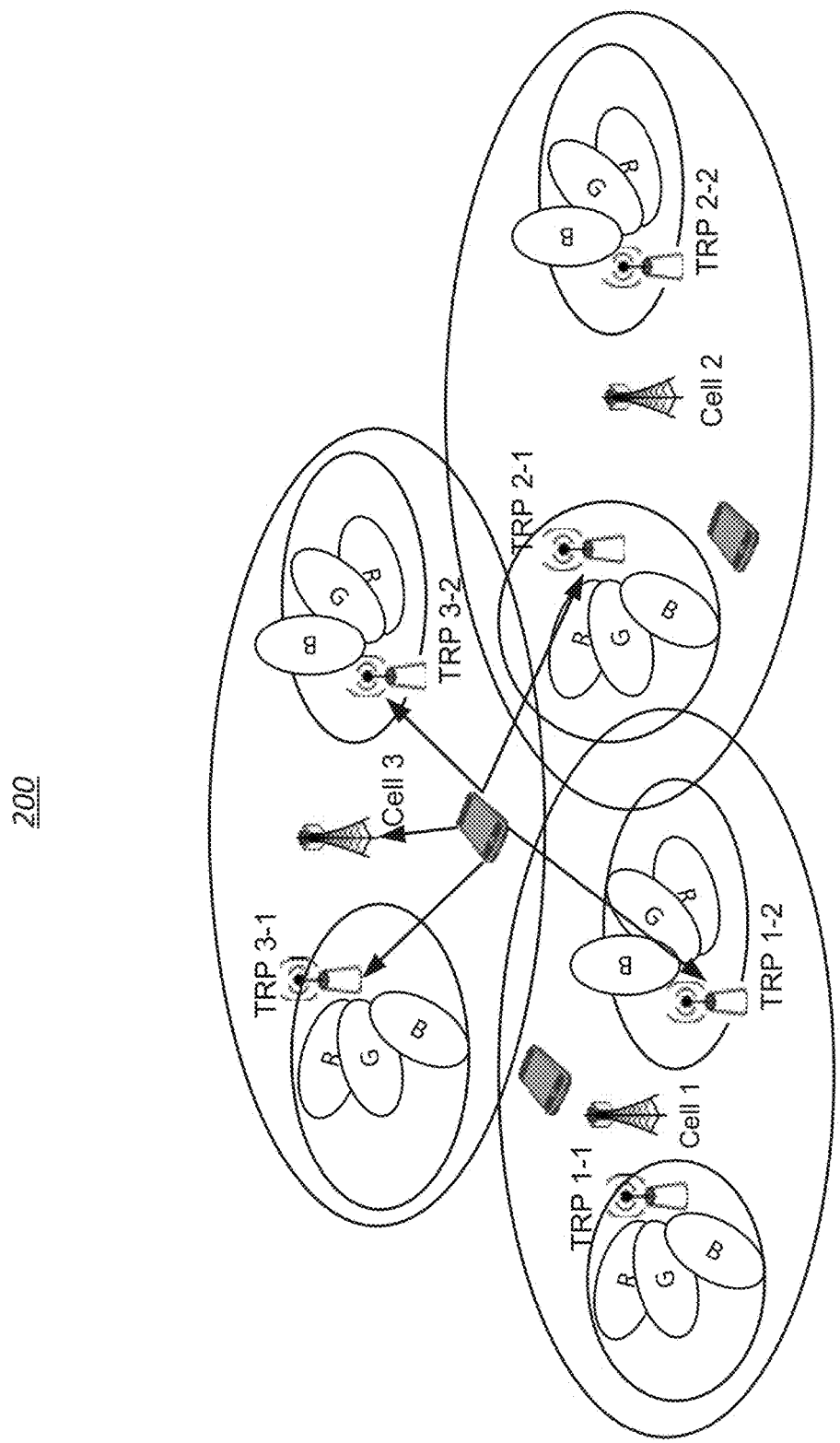
FIG. 2 illustrates a block diagram of an example UL adaptation in multi-beam configuration.

In some embodiments, the power control module 112 may be configured to obtain individual DL path loss of each beam among multiple detected beams in a multi-beam configuration. Then the DL path loss $PL_c$ function in formula (1) may be determined accordingly. In other embodiments, the base station 102 may obtain the individual DL path loss and signal (e.g., broadcast) it to the user equipment 104. In multi-beam configuration, the user equipment 104 may detect one or more DL beams above a detection threshold. In an IDLE mode, the user equipment 104 may select a DL beam for initial access. In a CONNECTED mode, the user equipment 104 may dynamically adapt to one of the multiple detected beams with best channel quality for DL data services. Similarly, the user equipment 104 may dynamically associate with a selected DL beam for the PUSCH transmission with DL or UL beam correspondence as shown in FIG. 2. FIG. 2 illustrates a block diagram of an example UL adaptation 200 in the multi-beam configuration. For beam specific power control, the communication system 100 may define beam specific open and closed loop parameters. The power control module 112 may take UL adaptation into account when determining the PUSCH transmission power in the multi-beam configuration.

In some embodiments, the DL path loss function $PL_c$ may be associated with multiple measured individual DL path losses, denoted as $PL_{c,m}$. The individual path loss $PL_{c,m}$ may be measured from beam m of M detected beams of the serving cell c, wherein $m \in \{1, 2, \ldots M\}$ and M is the number of the multiple detected beams. The DL path loss function $PL_c$ may be set to individual path loss $PL_{c,m}$ if the close-loop power correction factor $f_c(i)$ is not accumulated. If the close-loop power correction factor $f_c(i)$ is accumulated from a previous one, the close-loop power control may be operated to adapt the single radio channel for link quality adaptation. So the DL path loss function $PL_c$ may be set to follow a single path loss of a selected beam as the reference link. The DL path loss function $PL_c$ of UL dynamic link adaptation of any DL beam m may be calculated based on the reference path loss and additional path loss deviation of path loss of beam m comparing to the path loss of reference link. For example, the DL path loss $PL_c$ may be calculated as follows:

$$PL_c = PL_{c,R} + \delta_{c,R,m} \qquad (6),$$

where $PL_{c,R}$ is a reference path loss, $\delta_{c,R,m} = \beta*(PL_{c,m} - PL_{c,R})$, where $\beta$ is a correlation factor between beams configured by higher layer and $0 < \beta \le 1$.

In some embodiments, when the multiple beams are configured with little or no DL or UL beam correspondence, e.g., each beam is transmitted from each TRP as shown in FIG. 2, the UL transmission may be received at multiple reception points or beams. The DL path loss function $PL_c$ may be defined as an optimization of joint reception of the multiple measured individual DL path losses $\{PL_{c,1}, PL_{c,2}, \ldots, PL_{c,M}\}$. Power control for joint reception of multiple reception points or beams in the cooperative set is to achieve the target SINR, and also to minimize the interference to neighboring beams not in the cooperative set. Therefore, the optimization of the DL path loss function $PL_c$ may be defined as follows, $$PL_c = \min\{PL_{c,1}, PL_{c,2}, \ldots, PL_{c,M}\} \qquad (7),$$

where the path loss compensation is based on the minimum of all individual DL path losses measurement. This optimization of joint reception is to ensure at least one reception point or beam to attain desired power for the path loss compensation and minimize the interference to other received points or beams that are not in the cooperative set. The received signals at other reception points or beams may be the enhancement after maximum ratio combining (MRC).

In some embodiments, another optimization of the joint reception may be the maximum of the multiple measured individual DL path losses, to ensure each reception point or beam to obtain proper power compensation and to achieve target SINR. For example, the optimization of the joint reception may be calculated as follows:

$$PL_c = \max\{PL_{c,1}, PL_{c,2}, \ldots, PL_{c,M}\} \qquad (8).$$

In some embodiments, yet another optimization for the joint reception may be a weighted combination of the multiple measured individual DL path losses, represented as follows:

$$PL_c = \frac{1}{M}(w_1 PL_{c,1} + w_2 PL_{c,2} + \ldots \ldots + w_M PL_{c,M}). \qquad (9)$$

where the weighting factor $w_m$, $m \in \{1, 2, \ldots, M\}$ may be equal to or configured by higher layer for bias compensation toward some reception points or beams.

In some embodiments, the power control module 112 may configured to use any one or all of the factors described above to determine the PUSCH transmission power. For example, the PUSCH transmission power $P_{PUSCH,c}(i,j)$ may be calculated as follows:

$$P_{PUSCH,c}(i, j) = \qquad (10)$$
$$\min\left\{\begin{array}{c} P_{CMAX,c}(i) - \Delta_{B,c}(j), \\ 10\log_{10}(M_{PUSCH,c}(i)) + \delta_{SCS} + P_{O\_PUSCH,c}(j) + \\ \alpha_c(j) \cdot PL_c + \Delta_{TF,c}(i) + f_c(i) \end{array}\right\}.$$

As described above, $\Delta_{B,c}(j)$ is the $P_{cMAX,c}(i)$ back-off factor of operating waveforms, such as CP-OFDM and DFT-S-OFDM based waveforms, of serving cell c using parameter set configuration with index j in PUSCH transmission period i. When j=0, $\Delta_{B,c}(j)$ is the back-off factor for measured PAPR of configured DFT-S-OFDM based waveforms; when j=1, $\Delta_{B,c}(j)$ is the back-off factor for measured PAPR of configured CP-OFDM waveforms. $M_{PUSCH,c}(i)$ is the bandwidth of the PUSCH resource assignment expressed in number of resource blocks valid in PUSCH transmission period i.

In addition, $\delta_{SCS}$ is the numerology adjustment factor when the configured numerology of PUSCH transmission in period i is different from the default numerology. The cell specific nominal component $P_{O\_NOMINAL\_PUSCH,c}(j)$ of the target power $P_{O\_PUSCH,c}(j)$ may be provided by higher layers. Similarly, the UE specific component $P_{O\_UE\_PUSCH,c}(j)$ of the target power $P_{O\_PUSCH,c}(j)$ may be provided by higher layers for j=0 and 1. Specifically, the cell specific nominal component $P_{O\_NOMINAL\_PUSCH,c}(j)$ may be configured as follows: when j=0 $P_{O\_NOMINAL\_PUSCH,c}(j)$ may be set based on the target SINR associated with SB-OMA; when j=1, $P_{O\_NOMINAL\_PUSCH,c}(j)$ may be set based on the target SINR associated with GRMA; when j=2, $P_{O\_NOMINAL\_PUSCH,c}(j)$ may be set based on the target SINR associated with NOMA. The UE specific component $P_{O\_UE\_PUSCH,c}(j)$ may be configured as follows: when j=0, $P_{O\_UE\_PUSCH,c}(1)$ may be set based on the target SINR associated with Quality of Service (QoS) Class Identifier (QCI) index based on the eMBB service reliability requirements; when j=1, $P_{O\_UE\_PUSCH,c}(j)$ may be set based on the target SINR associated with QCI index based on the URLLC service reliability requirements.

Moreover, $\alpha_c(j)$ is the scaling factor of fractional power control configured by higher layers. In the multi-beam configuration, the DL path loss function $PL_c$ may be configured to support dynamic link adaptation or joint reception. For dynamic link adaptation, it may be defined as follows: when j=0, if the close-loop power correction factor $f_c(i)$ is not accumulated, $PL_c$ may be defined as the individual DL path loss $PL_{c,m}$ of the target beam m of the detected beams; when j=1, if the close-loop power correction factor $f_c(i)$ is accumulated, $PL_c$ may be defined based on the DL path loss of reference link and the deviation of the desired link, e.g., $PL_c = PL_{c,R} + \delta_{c,R,m}$, where $PL_{c,R}$ is a reference DL path loss, $\delta_{c,R,m} = \beta^*(PL_{c,m} - PL_{c,R})$, where β is a correlation factor between beams configured by higher layer and 0<β≤1. For joint reception at multiple reception points or beams, when j=2, $PL_c = \min\{PL_{c,1}, PL_{c,2}, \ldots, PL_{c,M}\}$; when j=3, $PL_c = \max\{PL_{c,1}, PL_{c,2}, \ldots, PL_{c,M}\}$; when j=4, $$PL_c = \frac{1}{M}(w_1 PL_{c,1} + w_2 PL_{c,2} + \ldots + w_M PL_{c,M}),$$

where the weighting factor $w_m$, m∈{1, 2, ..., M} may be equal to or configured by higher layer for bias compensation toward selected reception points or beams.

Furthermore, $\Delta_{TF,c}(i)$ is a UE specific parameter for different type of traffic, such as UCI on PUSCH transmission, provided by higher layers. The component $f_c(i)$ is a power correction for close-loop power control. For example, $f_c(i)$ may be calculated as follows: when accumulation is enabled, $f_c(i) = f_c(i-1) + \delta_{PUSCH}(i - K_{PUSCH})$; and when accumulation is not enabled, $f_c(i) = \delta_{PUSCH}(i - K_{PUSCH})$, where $\delta_{PUSCH}$ is an UE specific correction value through close-loop power control indicated by Downlink Control Information (DCI), $K_{PUSCH}$ is an offset with respect to the DL slot where the UL grant was received.

Figure 3:
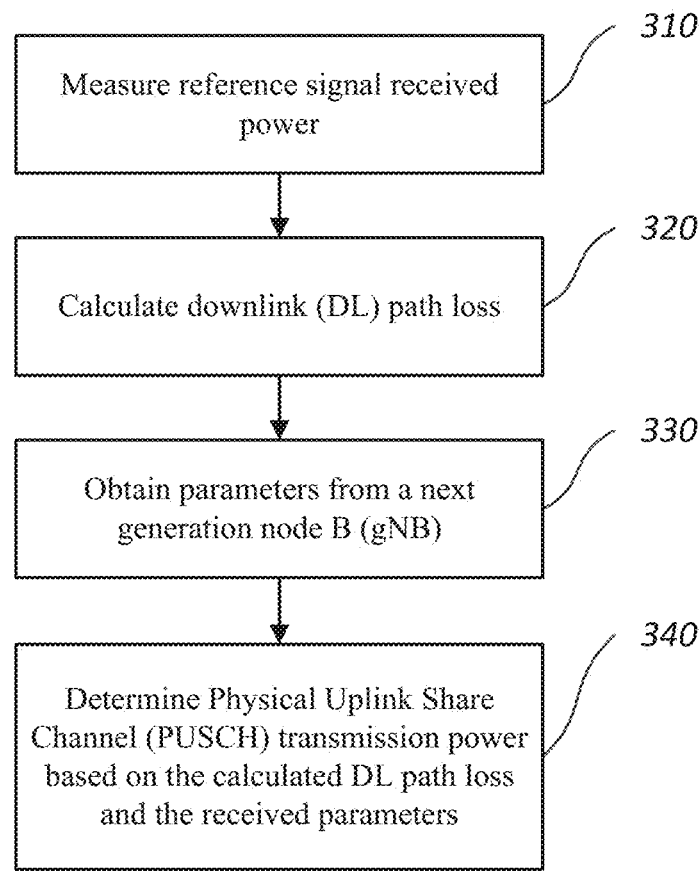
FIG. 3 illustrates a flow chart of an example method for determining Physical Uplink Share Channel (PUSCH) transmission power in accordance with various embodiments of the disclosure.

FIG. 3 illustrates a flowchart of an example method 300 for determining Physical Uplink Share Channel (PUSCH) transmission power in accordance with various embodiments of the present disclosure. The method 300 may be implemented in various systems including, for example, the communication system 100 of FIG. 1. The operations of the method 300 presented below are intended to be illustrative. Depending on the implementation, the method 300 may include additional, fewer, or alternative steps performed in various orders or in parallel. The method 300 may be implemented in various computing systems or devices including one or more processors.

With respect to the method 300, at block 310, a reference signal received power may be measured. At block 320, a downlink (DL) path loss may be calculated based on the reference signal received power. At block 330, parameters may be obtained from the base station 102, e.g., a next generation node B (gNB). At block 340, the PUSCH transmission power may be determined based on the calculated DL path loss and the received parameters. For example, the PUSCH transmission power may be determined based on the formula (1).

Figure 4:
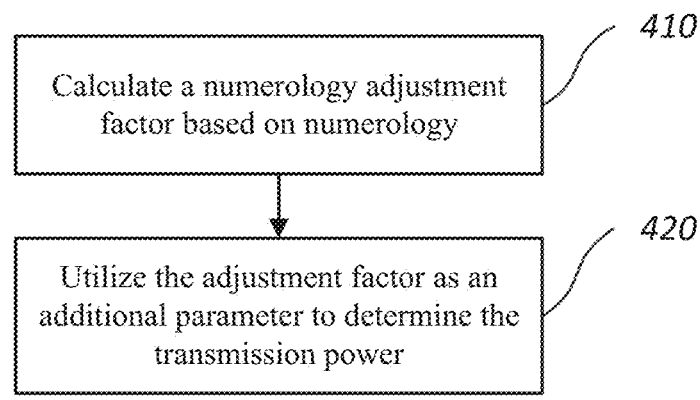
FIG. 4 illustrates a flow chart of an example method for utilizing an adjustment factor to determine the PUSCH transmission power in accordance with various embodiments of the disclosure.

FIG. 4 illustrates a flowchart of an example method 400 for utilizing an adjustment factor to determine the PUSCH transmission power in accordance with various embodiments of the disclosure. The method 400 may be implemented in various systems including, for example, the communication system 100 of FIG. 1. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

At block 410, a numerology adjustment factor may be calculated based on numerology. For example, the numerology adjustment factor may be calculated based on the formula (2). At block 420, the numerology adjustment factor may be utilized as an additional parameter to determine the PUSCH transmission power. For example, the PUSCH transmission power may be determined according to formula (3).

Figure 5:
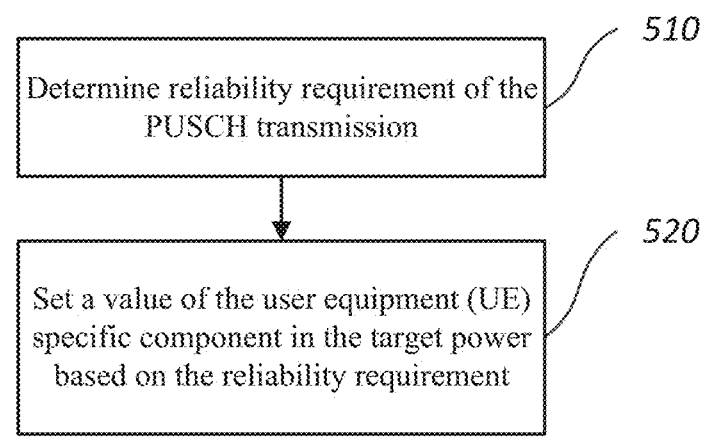
FIG. 5 illustrates a flow chart of an example method for setting a value of the user equipment (UE) specific component in the PUSCH transmission power in accordance with various embodiments of the disclosure.

FIG. 5 illustrates a flowchart of an example method 500 for setting a value of the user equipment (UE) specific component in the PUSCH transmission power in accordance with various embodiments of the disclosure. The method 500 may be implemented in various environments including, for example, the communication system 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 510, reliability requirement of the PUSCH transmission may be determined. At block 520, a value of the UE-specific component in the target power may be set based on the determined reliability requirement. For example, the UE-specific component $P_{O\_UE\_PUSCH,c}(j)$ of the target power $P_{O\_PUSCH,c}(j)$ in the formula (1) may be set to a value based on the determined reliability requirement as follows: e.g., when j=0, $P_{O\_UE\_PUSCH,c}(j)$ may be set based on the target SINR associated with the QCI index based on the eMBB service reliability requirements; when j=1 $P_{O\_UE\_PUSCH,c}(j)$ may be set based on the target SINR associated with the QCI index based on the URLLC service reliability requirements.

Figure 6:
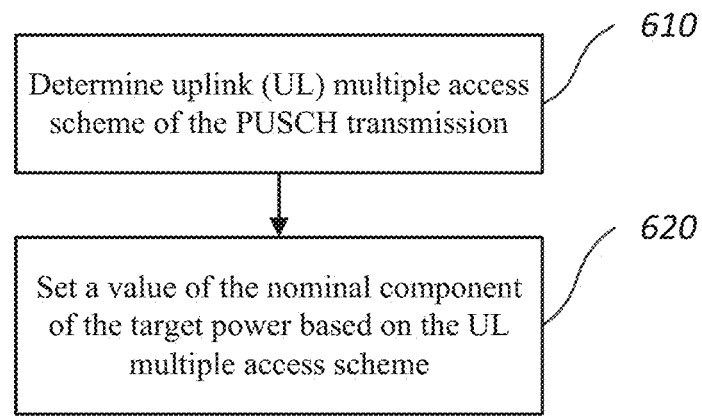
FIG. 6 illustrates a flow chart of an example method for setting a value of the nominal component of the PUSCH transmission power in accordance with various embodiments of the disclosure.

FIG. 6 illustrates a flowchart of an example method 600 for setting a value of the nominal component of the PUSCH transmission power in accordance with various embodiments of the disclosure. The method 600 may be implemented in various environments including, for example, the communication system 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

At block 610, a UL multiple access scheme of the PUSCH transmission may be determined. At block 620, a value of the nominal component of the target power may be set based on the UL multiple access scheme. For example, the cell specific nominal component $P_{O\_NOMINAL\_PUSCH,c}(j)$ may be configured as follows: when j=0, $P_{O\_NOMINAL\_PUSCH,c}(j)$ may be set based on the target SINR associated with SB-OMA; when j=1 $P_{O\_NOMINAL\_PUSCH,c}(j)$ may be set based on the target SINR associated with GRMA; when j=2, $P_{O\_NOMINAL\_PUSCH,c}(j)$ may be set based on the target SINR associated with NOMA.

Figure 7:
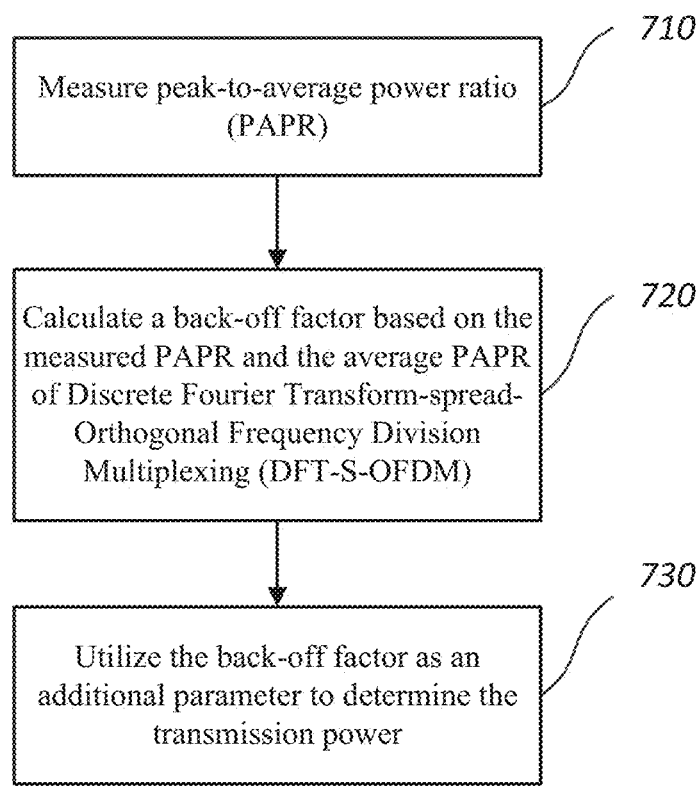
FIG. 7 illustrates a flow chart of an example method for utilizing a back-off factor to determine the PUSCH transmission power in accordance with various embodiments of the disclosure.

FIG. 7 illustrates a flow chart of an example method 700 for utilizing a back-off factor to determine the PUSCH transmission power in accordance with various embodiments of the disclosure. The method 700 may be implemented in various environments including, for example, the communication system 100 of FIG. 1. The operations of the method 700 presented below are intended to be illustrative. Depending on the implementation, the method 700 may include additional, fewer, or alternative steps performed in various orders or in parallel. The method 700 may be implemented in various computing systems or devices including one or more processors.

At block 710, a peak-to-average power ratio (PAPR) may be measured. At block 720, a back-off factor may be calculated based on the measured PAPR and the average PAPR of DFT-S-OFDM. For example, the back-off factor $\Delta_{B,c}(j)$ may be calculated according to the formula (4). At block 730, the back-off factor $\Delta_{B,c}(j)$ may be utilized as an additional parameter to determine the PUSCH transmission power based on the formula (5).

Figure 8:
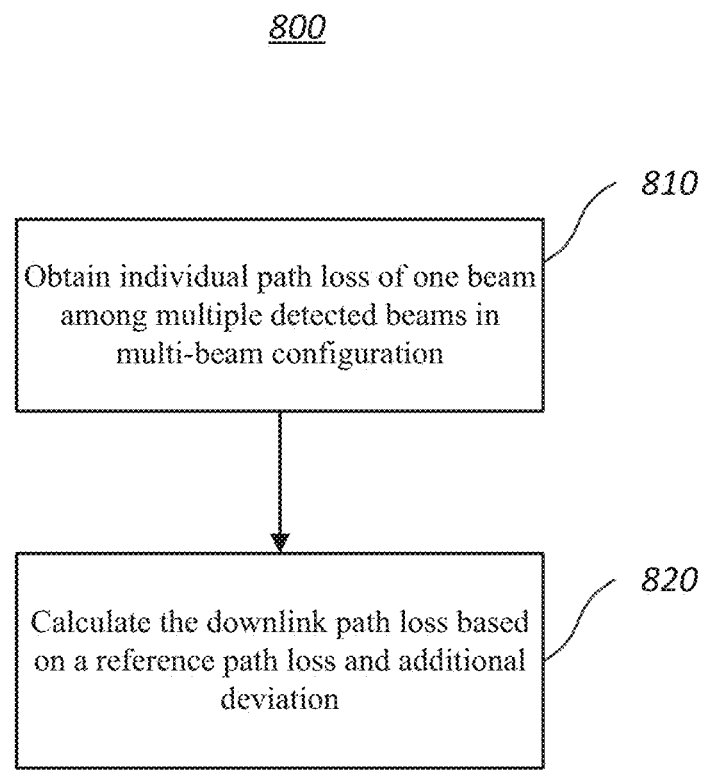
FIG. 8 illustrates a flow chart of an example method for calculating a downlink (DL) path loss in accordance with various embodiments of the disclosure.

FIG. 8 illustrates a flow chart of an example method 800 for calculating a downlink (DL) path loss in accordance with various embodiments of the disclosure. The method 800 may be implemented in various environments including, for example, the communication system 100 of FIG. 1. The operations of the method 800 presented below are intended to be illustrative. Depending on the implementation, the method 800 may include additional, fewer, or alternative steps performed in various orders or in parallel. The method 800 may be implemented in various computing systems or devices including one or more processors.

At block 810, individual path loss of one beam may be obtained among multiple detected beams in the multi-beam configuration. At block 820, the DL path loss $PL_c$ may be calculated based on a reference path loss and an additional deviation. For example, the DL path loss $PL_c$ may be calculated based on formula (6).

Figure 9:
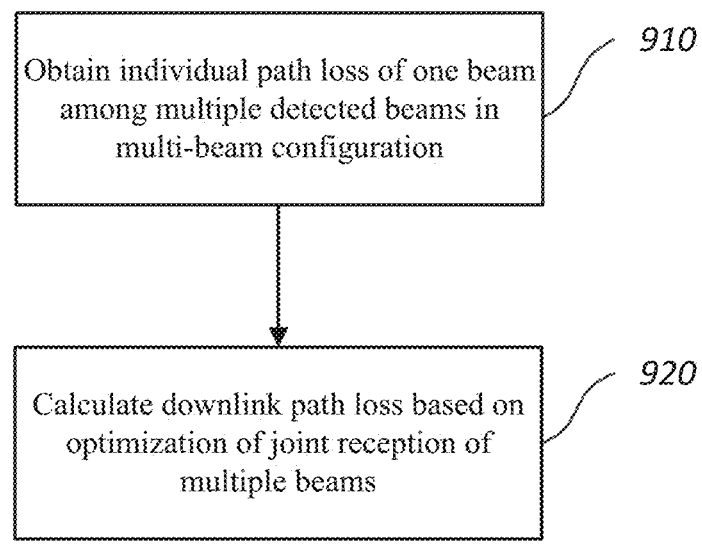
FIG. 9 illustrates a flow chart of another example method for calculating a DL path loss in accordance with various embodiments of the disclosure.

FIG. 9 illustrates a flow chart of another example method 900 for calculating a downlink (DL) path loss in accordance with various embodiments of the disclosure. The method 800 may be implemented in various environments including, for example, the communication system 100 of FIG. 1. The operations of the method 900 presented below are intended to be illustrative. Depending on the implementation, the method 900 may include additional, fewer, or alternative steps performed in various orders or in parallel. The method 900 may be implemented in various computing systems or devices including one or more processors.

At block 910, similar to method 800, individual path loss of one beam may be obtained among multiple detected beams in the multi-beam configuration. At block 920, the DL path loss $PL_c$ may be calculated based on optimization of joint reception of multiple beams. For example, the DL path loss function $PL_c$ may be defined as an optimization of joint reception of multiple measured individual DL path losses $\{PL_{c,1}, PL_{c,2}, \ldots, PL_{c,M}\}$ according to formula (7), (8) or (9).

Figure 10:
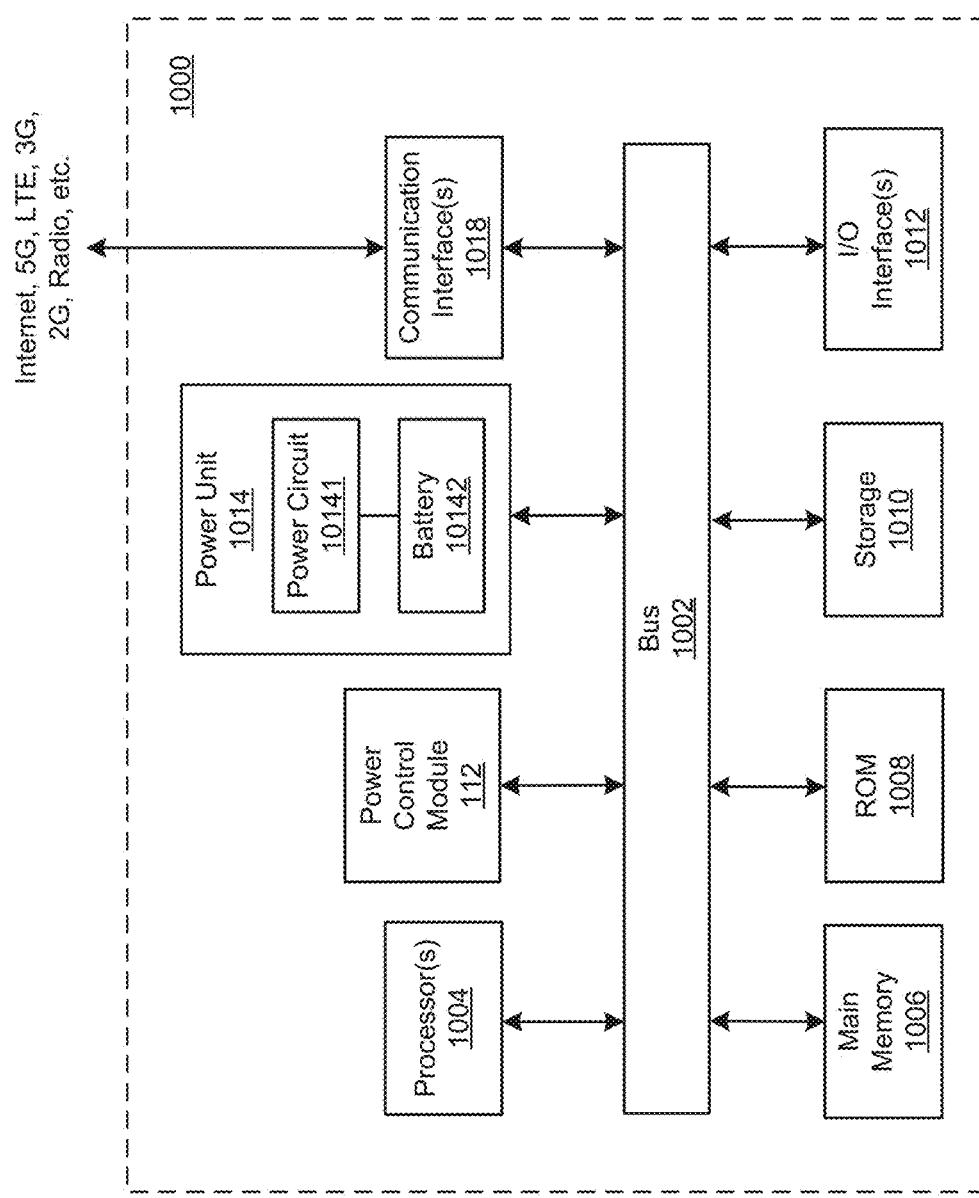
FIG. 10 illustrates a block diagram of an example system in which any of the embodiments described herein may be implemented.

FIG. 10 illustrates a block diagram of an example a system 1000 in which any of the embodiments described herein may be implemented. The system 1000 may be implemented as a variety of devices, e.g., a user equipment 104 (such as a mobile phone, a smart phone, a laptop computer or tablet equipped with a mobile broadband adapter, or any other devices supporting communication through corresponding networks), or a portion of a base station 102 (such as a gNB supporting 5G new radio, a eNB supporting LTE networks, a Node B in 3G UMTS communication networks, or a BTS in 2G GSM networks).

The system 1000 includes a bus 1002 or other communication mechanism for communicating information, one or more hardware processors 1004 coupled with bus 1002 for processing information. Hardware processor(s) 1004 may be, for example, one or more general purpose microprocessors, one or more Central Processing Units (CPUs), etc. For example, the system 1000 may be implemented as a mobile phone or sensor, and the processors(s) 1004 may be configured to control various functions of the mobile phone or sensor.

The system 1000 also includes a main memory 1006, such as a random access memory (RAM), cache and/or other dynamic storage devices, coupled to bus 1002 for storing information and instructions to be executed by the processor(s) 1004. Main memory 1006 also may be used for storing temporary variables or other intermediate information during execution of instructions to be executed by processor(s) 1004. Such instructions, when stored in storage media accessible to processor(s) 1004, render the system 1000 into a special-purpose machine that is customized to perform the operations specified in the instructions. The system 1000 further includes a read only memory (ROM) 1008 or other static storage device coupled to bus 1002 for storing static information and instructions for the processor(s) 1004. A storage device 1010, such as a magnetic disk, optical disk, or USB thumb drive (Flash drive), etc., is provided and coupled to bus 1002 for storing information and instructions.

The system 1000 may implement the techniques described herein using customized hard-wired logic, one or more ASICs or FPGAs, firmware and/or program logic which in combination with the computer system causes or programs the system 1000 to be a special-purpose machine. According to one embodiment, the techniques herein are performed by the system 1000 in response to processor(s) 1004 executing one or more sequences of one or more instructions contained in main memory 1006. Such instructions may be read into main memory 1006 from another storage medium, such as storage device 1008. Execution of the sequences of instructions contained in main memory 1006 causes processor(s) 1004 to perform the process steps described herein. In alternative embodiments, hard-wired circuitry may be used in place of or in combination with software instructions.

The main memory 1006, the ROM 1008, and/or the storage 1010 may include non-transitory computer readable storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Computer readable media may include permanent and volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to the computation device. Accordingly, the computer readable media may exclude transitory media, such as modulated data signals and carriers.

The system 1000 also includes a communication interface 1018 coupled to bus 1002. The communication interface 1018 provides a two-way data communication coupling to one or more network links that are connected to one or more local networks. For example, communication interface 1018 may be an integrated services digital network (ISDN) card, satellite chip, or a modem to provide a data communication connection to a corresponding type of telephone line. The communication interface 1018 may implement wireless communication links (e.g., 5G, LTE, 3G, 2G, radio, internet, etc.). In any such implementation, the communication interface 1018 sends and receives electrical, electromagnetic or optical signals that carry digital data streams representing various types of information.

The system 1000 may further include an I/O interface 1012 (e.g., keyboards, touchscreens, liquid crystal display, speaker, microphone, etc.). The I/O interface 1012 can input data captured from the outside environment and/or output data from the system 1000. The system 1000 can send messages and receive data, including program code, through the network(s), network link, I/O interface 1012, and the communication interface 1018. In the Internet example, a server might transmit a requested code for an application program through the Internet, the ISP, the local network and the communication interface 1018. The received code may be executed by processor(s) 1004 as it is received, and/or stored in storage device 1010, or other non-volatile storage for later execution.

The system 1000 may further include a power unit 1014. The power unit 1014 may include a power circuit 10141 and one or more batteries 10142 (e.g., Li-ion batteries) configured to power one or more components of the system 1000. The power circuit 10141 may couple to the one or more batteries 10142 and the power control module 112 of the system 1000. A person skilled in the art would appreciate that the supply of power from the batteries 10142 can be regulated by the power circuit 10141. The power circuit 10141 can be controlled by the processor(s) 1004 and/or via the power control module 112. For example, the one or more processor(s) 1004 may constrain the power supply and set the system 1000 to an idle mode to consume little or none power when the system 1000 is not operated for more than a preset time, and may set the system 1000 to an active mode to consumer power at a regular rate when the system 1000 is operated again. In another example, the power control module 112 may determine the PUSCH transmission power and control the power unit 1014 to transmit signals based on the determined PUSCH transmission power.

Though shown as separate units, various components of the system 1000 may also be integrated into other components of the system 1000. For example, the processor(s) 1004 or portions thereof may comprise the main memory 1006 and the ROM 1008, and the communication interface 1018 may comprise an antenna and a voltage rectifier, etc.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A method for determining a Physical Uplink Share Channel (PUSCH) transmission power, the method implementable by a user equipment (UE), the method comprising:
   measuring reference signal received power;
   calculating downlink path loss by comparing the reference signal received power to a downlink transmit power from a next generation node B (gNB);
   obtaining parameters from the gNB; and
   determining the PUSCH transmission power $P_{PUSCH,c}(i,j)$ for a PUSCH transmission of a serving cell c using parameter set configuration with index j in PUSCH transmission period i, based on a formula as follows:

$$P_{PUSCH,c}(i, j) = \min \left\{ \begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\},$$

wherein $P_{CMAX,c}(i)$ is a configured UE transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is a target power including the sum of a cell specific nominal component $P_{O\_NOMINAL\_PUSCH,c}(j)$ and a UE specific component $P_{O\_UE\_PUSCH,c}(j)$, $\alpha_c(j)$ is a scaling factor, $PL_c$ is a downlink (DL) path loss, $\Delta_{TF,c}(i)$ is a UE specific parameter for different types of traffic, and $f_c(i)$ is PUSCH power control adjustment state for the PUSCH transmission period i;

wherein the method further comprising:
   calculating a numerology adjustment factor $\delta_{scs}$ as follows:

$$\delta_{SCS} = 10\log\left(\frac{SCS_{conf}}{SCS_{default}}\right) \text{ [dB]},$$

wherein $SCS_{conf}$ is a configured subcarrier spacing for the PUSCH transmission and $SCS_{default}$ is default subcarrier spacing; and utilizing the numerology adjustment factor $\delta_{SCS}$ as an additional parameter to determine the PUSCH transmission power as follows:

$$P_{PUSCH,c}(i,j) = \min\left\{ \begin{array}{c} P_{CMAX,c}(i), \\ 10\log_{10}(M_{PUSCH,c}(i)) + \delta_{SCS} + P_{O\_PUSCH,c}(j) + \\ \alpha_c(j)\cdot PL_c + \Delta_{TF,c}(i) + f_c(i) \end{array} \right\}.$$

2. The method of claim 1, further comprising:
determining a reliability requirement of the PUSCH transmission; and
setting a value of a UE specific component $P_{O\_UE\_PUSCH,c}(i)$ in the target power $P_{O\_PUSCH,c}(j)$ based on the reliability requirement.

3. The method of claim 2, wherein the reliability requirement includes one or more of Ultra Reliable Low Latency Communication (URLLC) and enhanced Mobile Broadband (eMBB).

4. The method of claim 1, further comprising:
determining a UL multiple access scheme of the PUSCH transmission; and
setting a value of the nominal component $P_{O\_NOMINAL\_PUSCH,c}(j)$ of the target power $P_{O\_PUSCH,c}(j)$ based on the UL multiple access scheme.

5. The method of claim 4, wherein the multiple access scheme includes one or more of scheduled based orthogonal multiple access (SB-OMA), non-orthogonal multiple access (NOMA) and grant free multiple access (GRMA).

6. The method of claim 1, further comprising:
measuring peak-to-average power ratio (PAPR);
calculating a back-off factor $\Delta_{B,c}(j)$ based on the measured PAPR, $PAPR_{measured}$, and the average PAPR of Discrete Fourier Transform-spread-Orthogonal Frequency Division Multiplexing (DFT-S-OFDM), $Avg.PAPR_{DFT-S-OFDM}$, as follows:

$$\Delta_{B,c}(j) = 10\log\left(\frac{PAPR_{measured}}{Avg.PAPR_{DFT-S-OFDM}}\right) \text{ [dB]};$$

and utilizing the back-off factor $\Delta_B(j)$ as an additional parameter to determine the transmission power as follows:

$$P_{PUSCH,c}(i,j) = \min$$

$$\left\{ \begin{array}{c} P_{CMAX,c}(i) - \Delta_{B,c}(j), \\ 10\log_{10}(M_{PUSCH,c}(i)) + P_{O\_PUSCH,c}(j) + \alpha_c(j)\cdot PL_c + \Delta_{TF,c}(i) + f_c(i) \end{array} \right\}.$$

7. The method of claim 1, further comprising:
obtaining individual downlink (DL) path loss $PL_{c,m}$ of one beam m among multiple detected beams in multi-beam configuration, wherein $m\in\{1, 2 \ldots, M\}$ and M is the number of the multiple detected beams; and
calculating the DL path loss $PL_c$ as follows: $PL_c = PL_{c,R} + \delta_{c,R,m}$, wherein $PL_{c,R}$ is a reference path loss, $\delta_{c,R,m} = \beta^*(PL_{c,m} - PL_{c,R})$, wherein $\beta$ is a correlation factor between beams configured by higher layer and $0 < \beta \le 1$.

8. The method of claim 1, further comprising:
obtaining individual downlink (DL) path loss $PL_{c,m}$ of one beam m among multiple detected beams in multi-beam configuration, wherein $m\in\{1, 2, \ldots, M\}$ and M is the number of the multiple detected beams; and
calculating the DL path loss $PL_c$ based on an optimization of joint reception of multiple path losses.

9. The method of claim 8, wherein the DL path loss $PL_c$ is calculated as the minimum of all individual DL path loss $\min\{PL_{c,1}, PL_{c,2}, \ldots, PL_{c,M}\}$.

10. The method of claim 8, wherein the DL path loss $PL_c$ is calculated as the maximum of all individual DL path loss $\max\{PL_{c,1}, PL_{c,2}, \ldots, PL_{c,M}\}$.

11. The method of claim 8, wherein the DL path loss $PL_c$ is calculated as a weighted combination of all individual DL path loss $$\frac{1}{M}\{w_1 PL_{c,1} + w_2 PL_{c,2} + \ldots + w_M PL_{c,M}\}.$$

12. A user equipment (UE) for determining a Physical Uplink Share Channel (PUSCH) transmission power, the user equipment comprising:
one or more processors; and
a memory storing instructions that, when executed by the one or more processors, cause the user equipment to perform:
measuring reference signal received power;
calculating downlink path loss by comparing the reference signal received power to a downlink transmit power from a next generation node B (gNB);
obtaining parameters from the gNB; and
determining the PUSCH transmission power $P_{PUSCH,c}(i,j)$ for a PUSCH transmission of a serving cell c using parameter set configuration with index j in PUSCH transmission period i, based on a formula as follows:

$$P_{PUSCH,c}(i,j) = \min$$

$$\left\{ \begin{array}{c} P_{CMAX,c}(i), \\ 10\log_{10}(M_{PUSCH,c}(i)) + P_{O\_PUSCH,c}(j) + \alpha_c(j)\cdot PL_c + \Delta_{TF,c}(i) + f_c(i) \end{array} \right\},$$

wherein $P_{CMAX,c}(i)$ is a configured UE transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is a target power including the sum of a cell specific nominal component $P_{O\_NOMINAL\_PUSCH,c}(i)$ and a UE specific component $P_{O\_UE\_PUSCH,c}(i)$, $\alpha_c(j)$ is a scaling factor, $PL_c$ is a downlink (DL) path loss, $\Delta_{TF,c}(i)$ is a UE specific parameter for different types of traffic, and f(i) is PUSCH power control adjustment state for the PUSCH transmission period i;
wherein the instructions, when executed by the one or more processors, further cause the user equipment to perform:
calculating a numerology adjustment factor $\delta_{scs}$ as follows:

$$\delta_{SCS} = 10\log\left(\frac{SCS_{conf}}{SCS_{default}}\right) \text{ [dB]},$$

wherein $SCS_{conf}$ is a configured subcarrier spacing for the PUSCH transmission and $SCS_{default}$ is default subcarrier spacing; and utilizing the numerology adjustment factor $\delta_{SCS}$ as an additional parameter to determine the PUSCH transmission power as follows:

$$P_{PUSCH,c}(i,j) = \min\left\{\begin{array}{c} P_{CMAX,c}(i), \\ 10\log_{10}(M_{PUSCH,c}(i)) + \delta_{SCS} + P_{O\_PUSCH,c}(j) + \\ \alpha_c(j)\cdot PL_c + \Delta_{TF,c}(i) + f_c(i) \end{array}\right\}.$$

13. The user equipment of claim 12, wherein the instructions, when executed by the one or more processors, further cause the user equipment to perform:

determining a reliability requirement of the PUSCH transmission; and setting a value of a UE specific component $P_{O\_UE\_PUSCH,c}(i)$ in the target power $P_{O\_PUSCH,c}(j)$ based on the reliability requirement.

14. The user equipment of claim 12, wherein the instructions, when executed by the one or more processors, further cause the user equipment to perform:

determining a UL multiple access scheme of the PUSCH transmission; and setting a value of the nominal component $P_{O\_NOMINAL\_PUSCH,c}(j)$ of the target power $P_{O\_PUSCH,c}(j)$ based on the UL multiple access scheme.

15. The user equipment of claim 12, wherein the instructions, when executed by the one or more processors, further cause the user equipment to perform:

measuring peak-to-average power ratio (PAPR);

calculating a back-off factor $\Delta_{B,c}(j)$ based on the measured PAPR, $PAPR_{measured}$, and the average PAPR of Discrete Fourier Transform-spread-Orthogonal Frequency Division Multiplexing (DFT-S-OFDM), Avg.PAPR$_{DFT-S-OFDM}$, as follows:

$$\Delta_{B,c}(j) = 10\log\left(\frac{PAPR_{measured}}{Avg.PAPR_{DFT-S-OFDM}}\right) [dB];$$

and utilizing the back-off factor $\Delta_B(j)$ as an additional parameter to determine the transmission power as follows:

$P_{PUSCH,c}(i,j) = \min$ $$\left\{\begin{array}{c} P_{CMAX,c}(i) - \Delta_{B,c}(j), \\ 10\log_{10}(M_{PUSCH,c}(i)) + P_{O\_PUSCH,c}(j) + \alpha_c(j)\cdot PL_c + \Delta_{TF,c}(i) + f_c(i) \end{array}\right\}.$$

16. The user equipment of claim 12, wherein the instructions, when executed by the one or more processors, further cause the user equipment to perform:

obtaining individual downlink (DL) path loss $PL_{c,m}$ of one beam m among multiple detected beams in multi-beam configuration, wherein $m \in \{1,2,\ldots,M\}$ and M is the number of the multiple detected beams; and calculating the DL path loss $PL_c$ as follows: $PL_c = P_{c,R} + \delta_{c,R,m}$, wherein $PL_{c,R}$ is a reference path loss, $\delta_{c,R,m} = \beta *(PL_{c,m} - PL_{c,R})$, wherein $\beta$ is a correlation factor between beams configured by higher layer and $0 < \beta \leq 1$.

17. The user equipment of claim 12, wherein the instructions, when executed by the one or more processors, further cause the user equipment to perform:

obtaining individual DL path loss $PL_{c,m}$ of one beam m among multiple detected beams in multi-beam configuration, wherein $m \in \{1, 2, \ldots, M\}$ and M is the number of the multiple detected beams; and calculating the DL path loss $PL_c$ based on an optimization of joint reception of multiple path losses.

18. A base station of a communication system for facilitating the determination of a Physical Uplink Share Channel (PUSCH) transmission power, the base station comprising:

a transceiver and a controller controlling the transceiver, the controller comprising one or more processors and a memory storing instructions that, when executed by the one or more processors, cause the controller to perform:

transmitting a signal including a reference signal to a user equipment (UE); and signaling the parameters to the user equipment for determining a PUSCH transmission power $P_{PUSCH,c}(i,j)$ for a PUSCH transmission of a serving cell c using parameter set configuration with index j in PUSCH transmission period i, based on a formula as follows:

$P_{PUSCH,c}(i,j) = \min$ $$\left\{\begin{array}{c} P_{CMAX,c}(i), \\ 10\log_{10}(M_{PUSCH,c}(i)) + P_{O\_PUSCH,c}(j) + \alpha_c(j)\cdot PL_c + \Delta_{TF,c}(i) + f_c(i) \end{array}\right\},$$

wherein $P_{CMAX,c}(i)$ is a configured UE transmission power for the serving cell c in the PUSCH transmission period i, $M_{PUSCH,c}(i)$ is bandwidth of PUSCH resource assignment expressed in number of resource blocks for PUSCH transmission period i, $P_{O\_PUSCH,c}(j)$ is a target power including the sum of a cell specific nominal component $P_{O\_NOMINAL\_PUSCH,c}(j)$ and a UE specific component $P_{O\_UE\_PUSCH,c}(j)$, $\alpha_c(j)$ is a scaling factor, $PL_c$ is a downlink path loss, $\Delta_{TF,c}(i)$ is a UE specific parameter for different types of traffic, and f(i) is PUSCH power control adjustment state for the PUSCH transmission period i;

signaling the parameters to the user equipment for calculating a numerology adjustment factor $\delta_{scs}$ as follows:

$$\delta_{SCS} = 10\log\left(\frac{SCS_{conf}}{SCS_{default}}\right)[dB],$$

wherein $SCS_{conf}$ is a configured subcarrier spacing for the PUSCH transmission and $SCS_{default}$ is default subcarrier spacing; and utilizing the numerology adjustment factor $\delta_{SCS}$ as an additional parameter to determine the PUSCH transmission power as follows:

$$P_{PUSCH,c}(i,j) = \min\left\{\begin{array}{c} P_{CMAX,c}(i), \\ 10\log_{10}(M_{PUSCH,c}(i)) + \delta_{SCS} + P_{O_{PUSCH},c}(j) + \\ \alpha_c(j)\cdot PL_c + \Delta_{TF,c}(i) + f_c(i) \end{array}\right\}.$$

* * * * *

UNITED STATES PATENT AND TRADEMARK OFFICE
CERTIFICATE OF CORRECTION

PATENT NO. : 10,341,961 B2
APPLICATION NO. : 15/933781
DATED : July 2, 2019
INVENTOR(S) : Fang-Chen Cheng It is certified that error appears in the above-identified patent and that said Letters Patent is hereby corrected as shown below:

In the Claims

Claim 2, Column 17, Line 18:
"(i)" should read -- (j) --.

Claim 12, Column 18, Line 52:
"(i)" should read -- (j) --.

Claim 12, Column 18, Line 53:
"(i)" should read -- (j) --.

Claim 13, Column 19, Line 20:
"(i)" should read -- (j) --.

Signed and Sealed this
Twenty-first Day of January, 2020

Andrei Iancu
*Director of the United States Patent and Trademark Office*